ered on a two-wheeled truck which, as
UNITED STATES PATENT OFFICE.

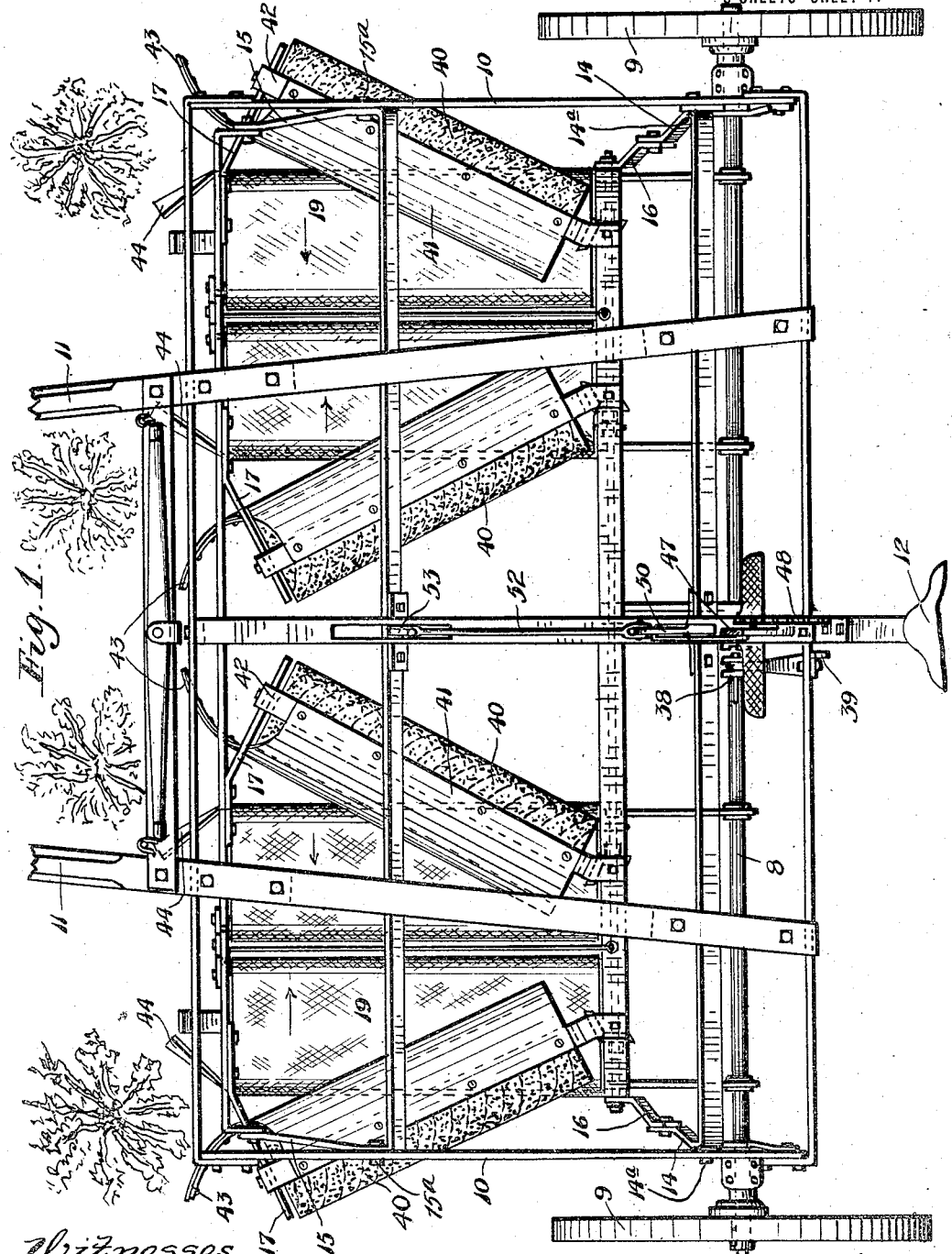

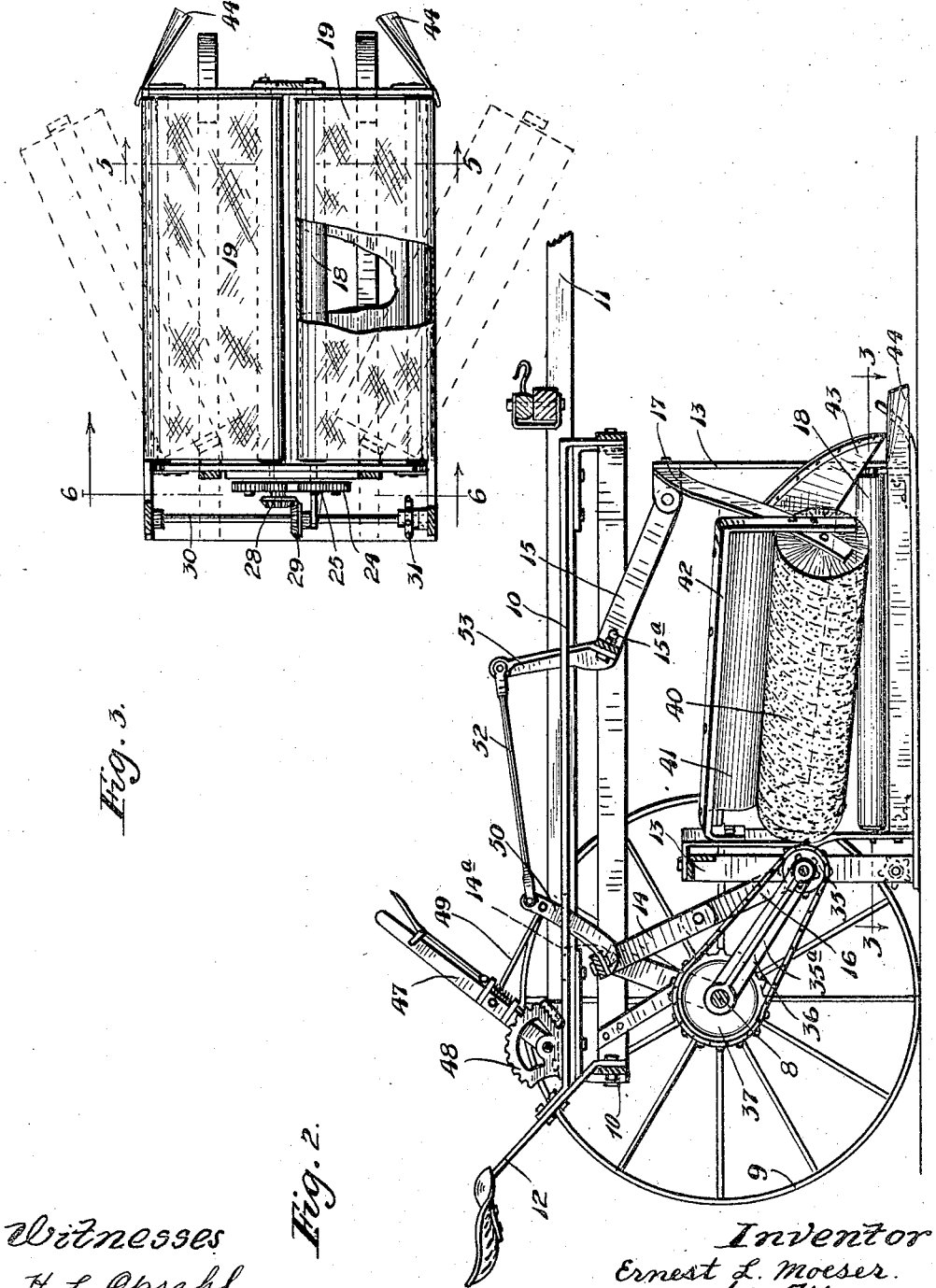

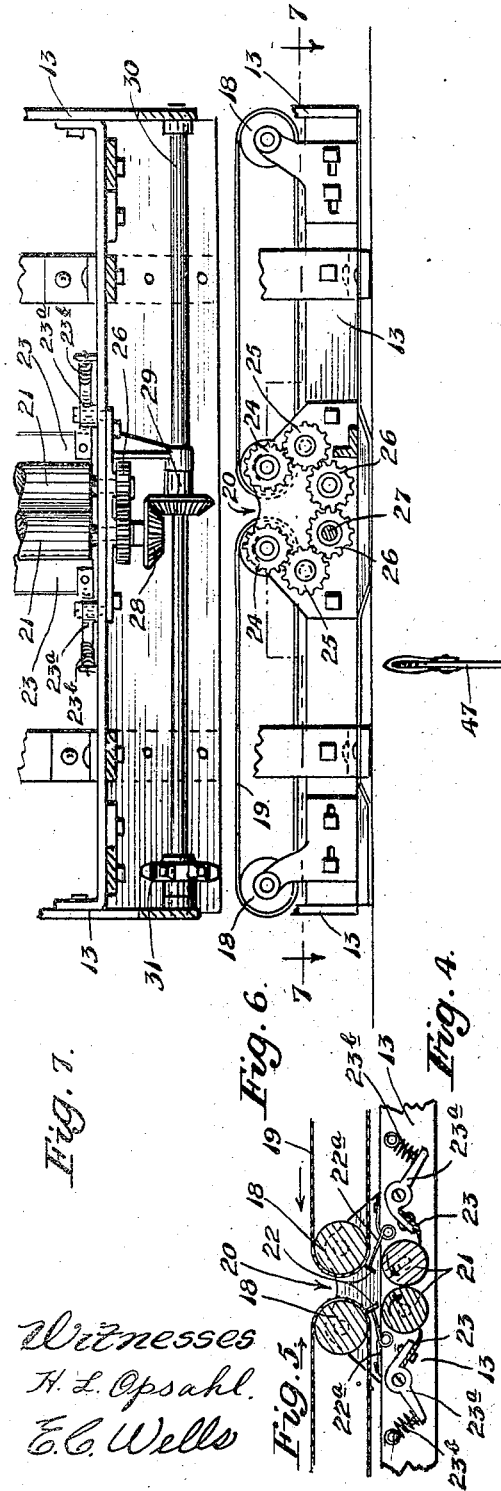

ERNEST L. MOESER, OF GOLDEN VALLEY, MINNESOTA.

POTATO-BUG KILLER.

1,249,988.

Specification of Letters Patent.

Patented Dec. 11, 1917.

Application filed July 10, 1916. Serial No. 108,266.

*To all whom it may concern:*

Be it known that I, ERNEST L. MOESER, a citizen of the United States, residing at Golden Valley, in the county of Hennepin and State of Minnesota, have invented certain new and useful Improvements in Potato-Bug Killers; and I do hereby declare the following to be a full, clear, and exact description of the invention, such as will enable others skilled in the art to which it appertains to make and use the same.

My invention has for its object to provide an improved machine for destroying potato bugs, and similar insects that live upon and are noxious to plant growth, and, to the above ends, generally stated, the invention consists of the novel devices and combinations of devices hereinafter described and defined in the claims.

The operations by which the bugs are removed from the plants and destroyed are all mechanical. By the action of rotary brushes and coöperating devices, the bugs are brushed from the plants or vines onto traveling aprons and by the latter are carried between crushing rollers, and from thence are thrown onto the ground. The invention also involves other important features as will hereinafter appear.

In the accompanying drawings which illustrate the invention, like characters indicate like parts throughout the several views.

Referring to the drawings:

Figure 1 is a plan view of the improved machine;

Fig. 2 is a right side elevation of the same;

Fig. 3 is a fragmentary view taken approximately on the line 3—3 of Fig. 2, some parts being broken away, and some parts being diagrammatically shown by dotted lines;

Fig. 4 is a rear elevation of the machine;

Fig. 5 is a fragmentary section on the line 5—5 of Fig. 3;

Fig. 6 is an enlarged section taken on the line 6—6 of Fig. 3; and

Fig. 7 is a horizontal section taken approximately on the irregular line 7—7 of Fig. 6, some parts being shown in full, and some parts being broken away.

All of the parts of the machine are carried on a two-wheeled truck which, as shown, is made up of an axle 8, wheels 9, journaled thereon, and a frame 10 having forwardly projecting rigidly attached shafts 11 and operator's seat 12.

The machine shown is a duplex machine, that is a machine having duplicate sets of bug destroying devices arranged to simultaneously operate on four rows of potato vines. The shafts 11 are so located that a horse hitched therein will travel between the inner two of the four rows that are being operated upon.

Each of the said duplicated bug destroying mechanisms comprises a supplemental frame 13. These supplemental frames 13 are adjustably supported on the main frame 10, preferably by the following connections. The numerals 14 and 15 respectively, indicate transversely long bail-like lifting levers each having four forwardly and downwardly extended arms, the outer of which arms are pivoted to the side bars of the main frame 10, respectively at 14$^a$ and 15$^a$. The lower ends of the arms of the lifting lever 14 are connected to the sides of the supplemental frames 13 by links 16, while the ends of the arms of the lifting lever 15 are connected to lugs or brackets 17 on the upper front portions of the said supplemental frames. (See particularly Figs. 1 and 2.) Each supplemental frame 13 supports two pairs of forwardly and rearwardly extended rollers 18 over which endless belts or aprons 19 are arranged to run. The inner rollers 18 are so spaced that the innermost portions of the aprons 19 do not come into contact, but have a gap 20 between them as best shown in Fig. 6.

Just below the inner rollers 18 are coöperating crushing rollers 21 that are arranged to run in close contact. Spring pressed scraper plates 22, supported from the supplemental frames 13 engage the under surfaces of the aprons 19, at points just above the crushing rollers. Other spring pressed scraper blades 23 also supported from the supplemental frames 13 engage the under surfaces of the said crushing rollers 21. (See particularly Fig. 5). The scraper blades 22, as shown, are carried at the free ends of spring arms 22$^a$ attached to cross bars of the frame 13. The scraper blades 23, as shown, are carried by short arms 23$^a$ intermediately pivoted to the same cross bars of the frame 13, and subject to coiled springs 23$^b$.

At their rear ends, the shafts of the inner rollers 18 are provided with spur gears 24 that mesh with intermediate spur gears 25 journaled on the rear portions of the supplemental frames 13. (See particularly Figs. 6 and 7). The intermediate gears 25 mesh with similar spur gears 26 which in turn intermesh, one with the other. One of the spur gears 26 is secured to a shaft 27 having at its rear end a beveled gear 28 that meshes with a bevel gear 29 on a transverse counter-shaft 30 journaled in suitable bearings on the rear portion of the corresponding supplemental frame 13. At the inner end of shaft 30 of each supplemental frame is a sprocket 31, sprocket chains 32 running over the sprockets 31 and over sprockets 33 (see Figs. 2 and 4) on a long transverse upper counter-shaft through both supplemental frames 13 and is journaled in suitable bearings thereon. At its central portion of the counter-shaft 34 is a sprocket 35. Numeral 36 indicates a link, one end of which is journaled on the axle 8, and the other end of which is journaled on the central portion of the upper counter shaft 34. Sprocket chain 35ª runs over the sprocket 35 and over a sprocket 37 that is normally loose on the central portion of the axle 8 and is adapted to be connected to said axle for rotation therewith, by a coöperating sliding half-clutch 38 on said axle. Half-clutch 38 is arranged to be moved into and out of action by a lever 39 pivoted to the rear portion of the end frame. (See Fig. 4).

Located above each apron 19 is a rotary brush 40 having shafts that are journaled in suitable bearings on the supplemental frames 13. These brushes are arranged in forwardly diverging pairs and they also preferably incline downwardly in a forwardly direction. Their front ends extend laterally beyond the outer edges of the coöperating aprons so that they form therewith a sort of crotch for directing the vines onto the coöperating aprons. The upper inner portions of said rollers are covered by curved gathering plates 41 shown as supported by bars 42 carried by the supplemental frames 13. The front ends of the plates 41 have curved arms or curved extensions 43 that assist in the gathering action. Secured to the front portions of the supplemental frames 13 near the outer portions of the aprons 19 are gathering arms 44 that coöperate with the arms 43 to increase the gathering action on the vines.

At their rear ends, the shafts of the brushes 40 are provided with beveled gears 45 that mesh with beveled gears 46 on the long counter-shaft 34.

When the machine is moved forward and the half-clutch 38 is locked to the hub of the sprocket 37, the brushes 40, aprons 19, and crushing rollers 21 will all be positively driven in directions indicated by arrows marked on Figs. 1, 4, and 7. The vines will be gathered in the crotches formed by the diverging portions of the aprons and gathering plates and brushes. The brushes will shake loose and brush down the bugs from the vines and cause them to fall onto the aprons 19, and by aprons they will be carried to the coöperating crushing rollers 21. The scrapers 22 prevent any of the bugs from clinging to the outer moving lower portions of the aprons and insure their delivery between the crushing rollers. The crushing rollers will not only kill the bugs, but crush the same. The scrapers 23, however, will scrape the crushed bugs off from the crushing rollers and cause the same to drop onto the ground.

The bail-like lifting levers 14 and 15 serve to lift the supplemental frame 13, keeping the same always substantially horizontal. For imparting vertical adjustments to the said supplemental frames, I provide a latch lever 47 that is pivoted to and coöperates with a latch segment 48 rigidly secured on the rear portion of the main frame 10. Latch lever 47 is connected by a rod 49, to an arm 50 rigidly secured and projecting upward from the central portion of the rear bail-like lever 40. This arm 50 is connected by a link 52 to an arm 53 secured to the central portion of the front bail-like lever 15.

By the use of the improved machine, potato bugs may be very rapidly destroyed without injuring the potato vines. Obviously the machine may be used for the destruction of various other insects which eat bushes and various vegetables that grow in bush-like form.

What I claim is:

1. In a machine for destroying insects, the combination with a pair of crushing rollers extended longitudinally of the line of travel of the machine, of a pair of approximately horizontal endless aprons arranged to deliver to said crushing rollers, means for driving the said aprons so that their upper portions move reversely and inward toward said crushing rollers, forwardly diverging cylindrical brushes overlying the respective aprons with their front ends projecting beyond the gathering portions of said aprons and at an angle thereto, and means for rotating said brushes so that their under portions move in the same direction as the upper portions of the coöperating endless aprons.

2. In a machine for destroying insects, the combination with coöperating crushing rollers, of an endless apron for delivering the bugs to said rollers, and a rotary brush overlying said apron with its axis oblique to the line of travel, and with its front end projecting beyond the outer portion of said apron, means for driving said rollers, apron and brush under advance movement of the machine, and a gathering plate overlying the upper inner portion of said brush and having an arm projecting forward thereof.

3. In a machine for destroying insects, the combination with coöperating crushing rollers, of reversely driven endless and approximately horizontal aprons arranged to deliver the bugs to the upper portions of said rollers, forwardly diverging rotary brushes overlying said aprons and projecting outward thereof at their forward portions, scrapers operating on the inner portions of said aprons and on the lower portions of said crushing rollers, and gathering plates overlying the inner upper portions of said brushes and having gathering arms projecting forward thereof.

In testimony whereof I affix my signature in presence of two witnesses.

ERNEST L. MOESER.

Witnesses:
CLARA DEMAREST,
F. D. MERCHANT.

Copies of this patent may be obtained for five cents each, by addressing the "Commissioner of Patents, Washington, D. C."